Sheet 1
F. Nishwitz.
Mower.
№ 3495 Reissued Jun. 8, 1869.
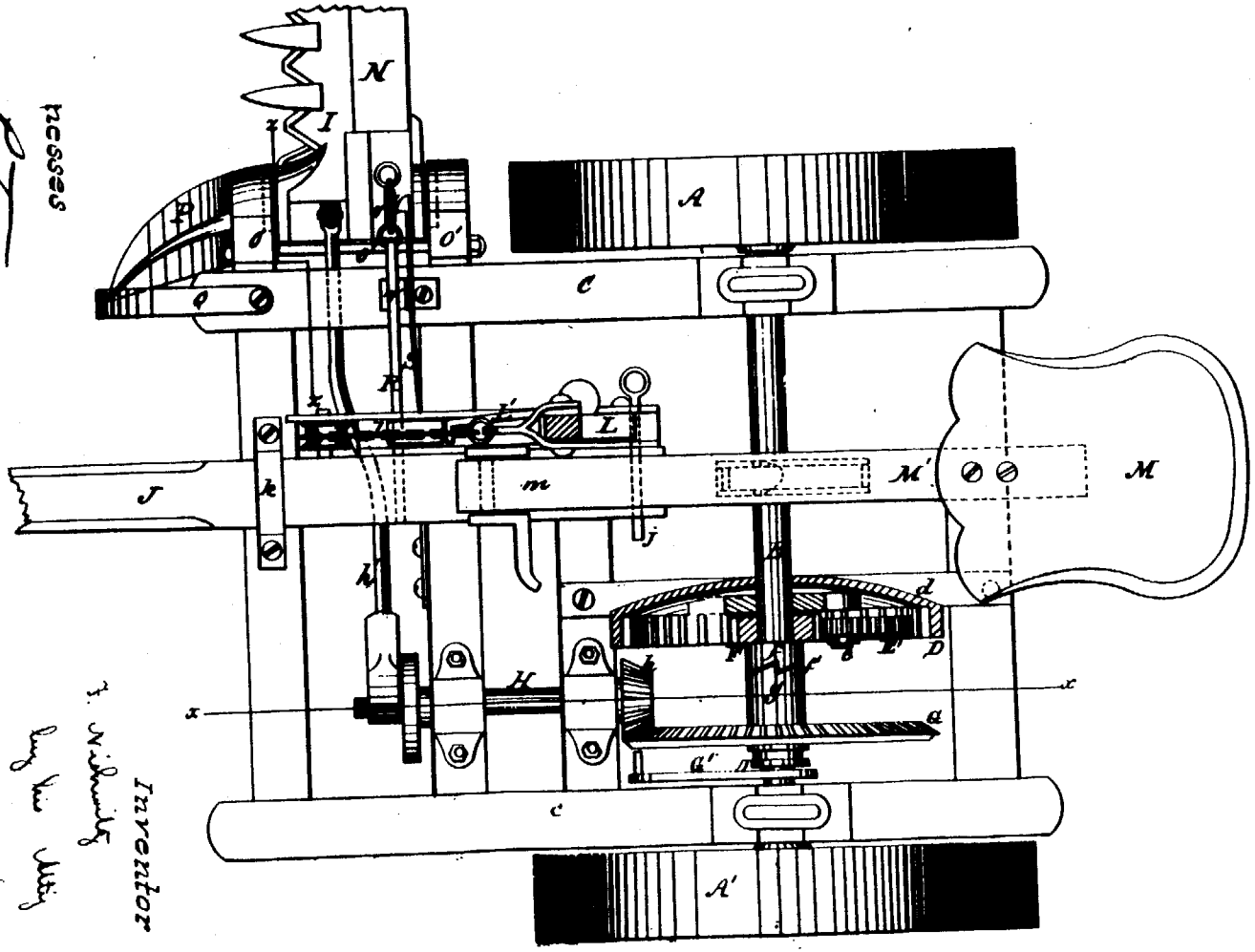
Inventor
F. Nishwitz
by his Atty
Wm. D. Baldwin
nesses
Peyton
Dr Long 2 Sheets
Sheet 2
F. Nishwitz.
Mower.
No. 3495 Reissued Jun. 8, 1869.
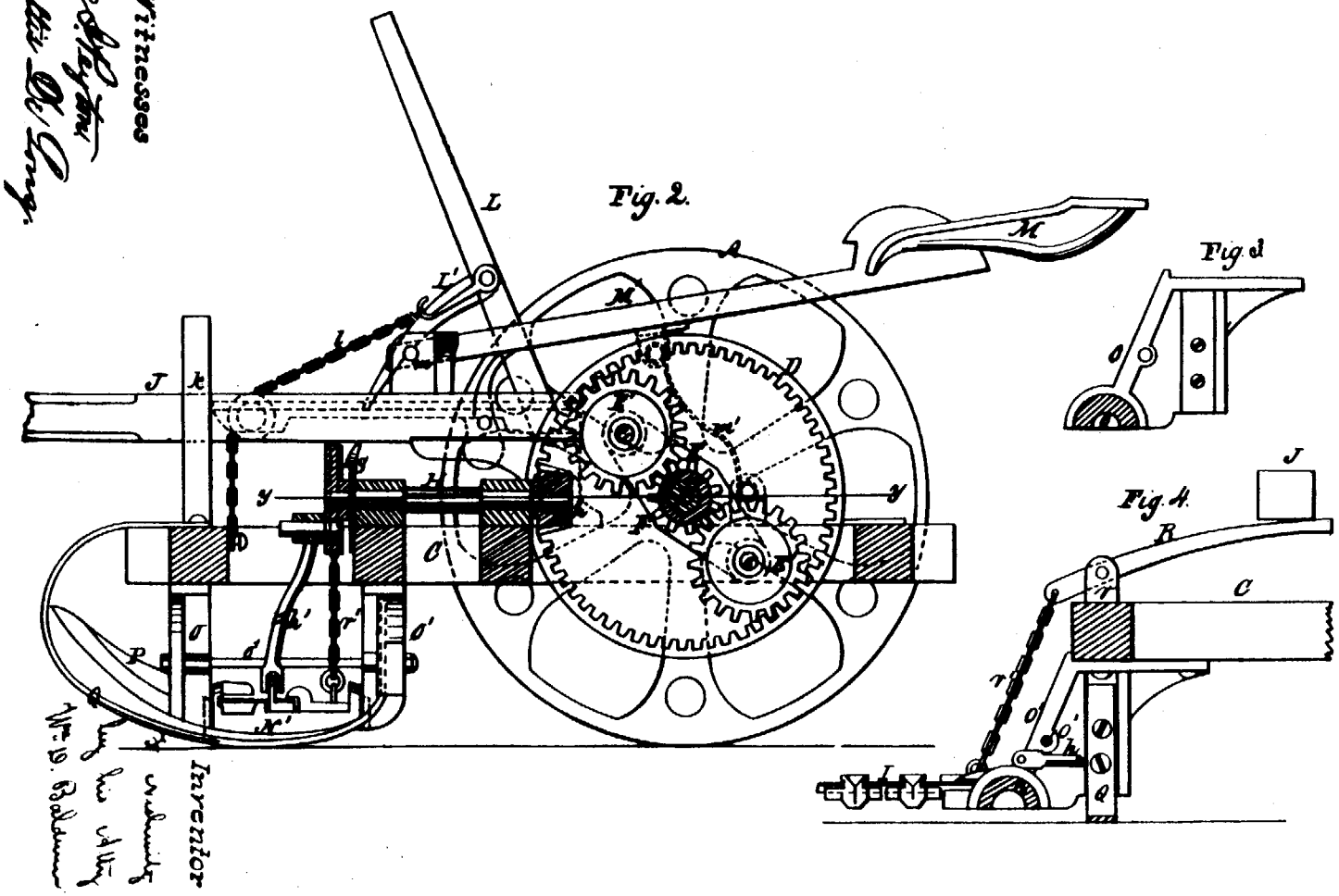
Witnesses
Joe. S. Peyton
Battis De Long.
Inventor
F. Nishwitz
by his Atty
Wm. D. Baldwin

BEST AVAILABLE COPY

UNITED STATES PATENT OFFICE.

F. NISHWITZ, OF BROOKLYN, NEW YORK.

IMPROVEMENT IN HARVESTERS.

Specification forming part of Letters Patent No. 46,488, dated February 21, 1865; Reissue No. 3,495, dated June 8, 1869.

DIVISION A.

*To all whom it may concern:*

Be it known that I, FREDERICK NISHWITZ, of Brooklyn, in the county of Kings and State of New York, have invented certain new and useful Improvements in Harvesters, of which the following is a full, clear, and exact description.

My invention relates to that class of harvesters having two driving and supporting wheels, and a finger-beam hinged to the main frame at one end only.

The object of the first part of my invention is to secure a strong connection between the finger-beam and main frame while allowing the former to vibrate freely vertically on its pivot; and the improvement consists in a novel method of securing the heel end of the finger-beam to a socket having semicircular sections fitting and turning in semicircular eves in pendents or down-hangers secured and extending below the gearing-frame, and secured by a clamping-bolt to prevent lateral deflection.

The object of the next part of my invention is to cause the inner shoe to run horizontally over the ground, irrespective of the vertical vibrations of the finger-beam on its pivot; and the improvement consists in a novel method of combining a strong metallic shoe, rigidly secured to the coupling-frame, with a finger-beam secured to a socket vibrating on a pivot behind the shoe.

The object of the next part of my invention is to prevent the cutting apparatus from bearing too heavily on the ground, and to protect the lower end of the pitman from being clogged by the cut crop, and also to prevent the cutter from dropping out of the finger-beam when folded; and the improvement consists in a novel method of combining, with the finger-beam and its shoe, a supplementary guard-shoe secured to the frame.

The improvement further consists in a novel method of combining a frame vibrating about a gear-center, and a laterally-projecting cutting apparatus, hinged to said frame at one end only, with a fixed shoe in advance of the finger-beam.

The accompanying drawings represent all my improvements as embodied in a machine similar in its general outlines to the one shown and described in Letters Patent of the United States No. 19,377, granted to me on the 16th day of February, 1858.

Figure 1 represents a plan or top view of my improved machine, and Fig. 2 represents a vertical longitudinal section through the machine at the line *x x* of Fig. 1, looking toward the divider side of the machine. Fig. 3 represents a view, in elevation, of the rear pendent detached, as seen from the front. Fig. 4 represents a vertical transverse section through the machine at the line *z z* of Fig. 1, looking toward the rear, and showing more particularly the method of lifting the divider end of the finger-beam.

In this instance two driving-wheels, A A′, are shown as mounted loosely on a common axle, B, with which they are connected by backing-ratchets of well-known construction. The axle B revolves loosely in suitable bearings on the gearing-frame C. An internally-geared spur-wheel, D, is secured upon a concave disk, *d*, fixed upon the gearing-frame in such manner that the spur-wheel D is concentric with the axle B. An arm, E, fixed upon, revolving with, and projecting on each side of the axle B, carries spur-pinions E′, revolving freely on pins *e*, and meshing on one side into the spur-wheel D, and on the other into a spur-pinion, F, fixed on a collar, *f*, turning freely on the main axle, and connected by a feather, *f′*, with a collar, *g*, also revolving loosely on the axle B, and carrying a bevel-wheel, G, driving a corresponding pinion, *h*, on a crank-shaft, H, which drives the cutters I by a crank and pitman, *h′*, in the usual way.

The mechanism is thrown into and out of gear by means of a shipping-lever, G′, provided with a cam-yoke fitting over a flange on the collar *g*. A tongue, J, is hinged to the main frame by a pivot, *j*, so as to vibrate freely vertically. A loop, *k*, on the front of the gearing-frame encompasses the tongue, acts as a stop to limit its descent below a given point, and sustains it against lateral strains, as in turning.

A lifting-lever, L, is pivoted on the tongue, and is connected with the forward end of the gearing-frame by a cord or chain, *l*, passing over a pulley on the tongue. A pawl, L′, pivoted on the hand-lever, takes into a ratchet-plate on the tongue, and holds up the gearing-frame, as described in my patent of 1858, hereinbefore referred to.

A seat, M, for the driver is mounted on an inclined arm, M′, pivoted at *m* to lugs on the draft-frame. This arm M′ is supported at a point intermediately between the pivot and the driver's seat by a link, *m′*, pivoted both to the bar and to the gear-frame behind the main axle, as shown by the dotted lines in Figs. 1 and 2. The pivots of the tongue, the inclined arm, and of the connecting-link thus form a sort of parallel rule-joint, which compensates for the vibrations of the tongue and gearing-frame, and enables the driver to maintain his proper relation to the lifting-lever, instead of his seat rocking backward and forward, as it would do if mounted directly upon the gearing-frame. As the seat is located behind the main axle, the weight of the driver tends both to lift the tongue and to depress the rear end of the gearing-frame, thus diminishing the pressure of the cutting apparatus on the ground, and causing the machine to run more lightly. The link *m′* is connected both with the arm M′ and with the frame by slots and set-screws, which permit it to be adjusted backward or forward, and thus balance the machine.

The finger-beam N is securely fastened to a socket, N′, provided with semicircular projections or flanges *n*, fitting in semicircular grooves *o* in pendants O O′, rigidly secured to the inner front corner of the gearing-frame, and connected by a clamping-bolt, *o′*. A metallic shoe, P, is firmly secured to and projects in advance of the front pendant O. The finger-beam is thus free to vibrate vertically on its pivots, while the shoe P is fixed. The finger-beam may likewise be readily detached from the main frame.

A supplementary guard-shoe, Q, composed of a flat bar of metal, is secured at its front end to the main frame, and curved downward, and its rear end is secured to its rear pendant O′. As this shoe is slightly elastic it relieves the pressure of the cutting apparatus upon the ground, and protects the pitman from being clogged by the cut crop; also prevents the cutters from falling out of the guards when the finger-beam is folded up.

A lever, R, is pivoted to vibrate vertically on a pivot, *r*, on the gear-frame. This lever is arranged in the same vertical plane as the finger-beam, is interposed between the tongue and the gearing-frame, and its outer end is connected by a chain, *r′*, with the finger-beam, at a point outside of its hinge. Consequently when the gearing-frame is lifted, by means of the hand-lever L, the tongue depresses the lever, and thus tips up the divider end of the cutting apparatus. The cutting apparatus may be folded up on its hinge until it rests against the main frame, in which position it may be held by a spring-hook, S. When thus folded up the entire cutting apparatus does not project beyond the outer face of the driving-wheel A, and the machine may consequently be driven through gates very little wider than the distance between the driving-wheels.

The operation of this machine being similar to other machines of this class, it is deemed unnecessary to describe it here.

What I claim as my invention is—

1. Connecting the finger-beam with the main frame by means of a joint composed of semicircular grooves in the pendants, and semicircular projections on the socket of the finger-beam, substantially as described.

2. The combination of the rigid metallic shoe with the finger-beam vibrating on a pivot behind the shoe, substantially as set forth.

3. The combination of the main frame, finger-beam, and the pitman with the supplementary guard-shoe, operating substantially as set forth.

4. The combination of a frame vibrating about a gear-center and a laterally-projecting cutting apparatus hinged to said frame at one end only with a fixed shoe in advance of the finger-beam, substantially as set forth.

F. NISHWITZ.

Witnesses:
JOE I. PEYTON,
JOHN J. CHEW.